United States Patent
Kanno et al.

(10) Patent No.: US 7,161,308 B2
(45) Date of Patent: Jan. 9, 2007

(54) HIGH-VOLTAGE DISCHARGE LAMP OPERATING DEVICE

(75) Inventors: Tomoyuki Kanno, Tokyo (JP); Naoki Sasaki, Tokyo (JP)

(73) Assignee: Sumida Corporation, Tokyo (JP)

( * ) Notice: Subject to any disclaimer, the term of this patent is extended or adjusted under 35 U.S.C. 154(b) by 120 days.

(21) Appl. No.: 10/521,967

(22) PCT Filed: Nov. 22, 2002

(86) PCT No.: PCT/JP02/12240

§ 371 (c)(1),
(2), (4) Date: Jan. 21, 2005

(87) PCT Pub. No.: WO2004/010743

PCT Pub. Date: Jan. 29, 2004

(65) Prior Publication Data

US 2005/0258782 A1    Nov. 24, 2005

(30) Foreign Application Priority Data

Jul. 23, 2002    (JP) .............................. 2002-214049

(51) Int. Cl.
    *H01B 37/04*    (2006.01)
(52) U.S. Cl. .................. 315/291; 315/307; 315/308
(58) Field of Classification Search ................ 315/194, 315/209 R, 224, 219, 291, 307, 308, DIG. 7
    See application file for complete search history.

(56) References Cited

U.S. PATENT DOCUMENTS

| | | | | |
|---|---|---|---|---|
| 5,416,387 A | | 5/1995 | Cuk et al. ............... | 315/209 R |
| 5,442,257 A | | 8/1995 | Mitsumoto et al. ......... | 315/129 |
| 5,485,061 A | | 1/1996 | Ukita et al. ................ | 315/307 |
| 5,491,387 A | * | 2/1996 | Saito ........................... | 315/307 |
| 5,872,429 A | * | 2/1999 | Xia et al. .................. | 315/194 |
| 6,144,172 A | | 11/2000 | Sun et al. .................. | 315/307 |
| 6,163,115 A | | 12/2000 | Ishizuka .................... | 315/307 |
| 6,208,089 B1 | * | 3/2001 | Ito et al. .................... | 315/308 |
| 6,288,501 B1 | | 9/2001 | Nakamura et al. .......... | 315/307 |

(Continued)

FOREIGN PATENT DOCUMENTS

JP    62-29785    2/1987

(Continued)

*Primary Examiner*—Tuyet Vo
*Assistant Examiner*—Jimmy Vu
(74) *Attorney, Agent, or Firm*—Snider & Associates; Ronald R. Snider (57) ABSTRACT

A high-voltage discharge lamp operating device capable of reducing the size and the weight of a DC-DC converter circuit, and accordingly of the operating device without generating any magnetic saturation of a transformer core part even when igniting a lamp in the operating device for operating a HID head lamp for a vehicle. A PWM control unit (6) comprises a power control unit (31) which receives a voltage detection signal and controls the duty of the signal waveform of a PWM control signal, an error amplifier (32) which compares the output from the power control unit (31) with the reference voltage and outputs an error level signal, an oscillation frequency control means (36) for outputting a rectangular wave signal so as to realize a high frequency for a predetermined period from the ignition of a HID lamp (5) and a low frequency after the elapse of a predetermined period, a triangular wave oscillator (34) which converts the rectangular wave signal into the triangular signal, and a comparator (35) which compares the error level signal with the triangular wave signal and outputs to a switching element (12) the PWM control signal on H-level during the period in which the triangular wave signal is high.

7 Claims, 6 Drawing Sheets

U.S. PATENT DOCUMENTS

| | | |
|---|---|---|
| 6,534,930 B1 * | 3/2003 | Ito et al. ............... 315/291 |
| 2002/0047644 A1 | 4/2002 | Ito et al. ............... 315/307 |

FOREIGN PATENT DOCUMENTS

| JP | 05-316729 | 11/1993 |
|---|---|---|
| JP | 07-170729 | 7/1995 |
| JP | 2942113 | 6/1999 |
| JP | 2000-286080 | 10/2000 |
| JP | 2001-230094 | 8/2001 |
| JP | 2001-313193 | 11/2001 |
| JP | 2002-354801 | 12/2002 |

* cited by examiner

FIG.1

PWM CONTROL UNIT OF THIS EMBODIMENT

(A) OSCILLATION FREQUENCY (200 KHz)

(B) OSCILLATION FREQUENCY (100 KHz)

FIG. 7
CONVENTIONAL PWM CONTROL UNIT

HIGH-VOLTAGE DISCHARGE LAMP OPERATING DEVICE

TECHNICAL FIELD

The present invention relates to an operating device for a high-voltage discharge lamp such as a HID lamp, and more particularly, to a high-voltage discharge lamp operating device which operates a headlight of a vehicle.

BACKGROUND ART

As a head lamp light source for a vehicle for improving visibility of a driver in the nighttime, a high intensity discharge lamp (HID lamp) is known.

This HID lamp can obtain brighter light than a conventional halogen lamp, etc., with small power, whereas it requires an operating device specific to the HID lamp which is different from the conventional lamp.

Furthermore, this operating device also needs to satisfy specific conditions as the device for a head lamp of a vehicle. That is, the head lamp for a vehicle must output a stable, high intensity light beam in a short time.

Figure 5:
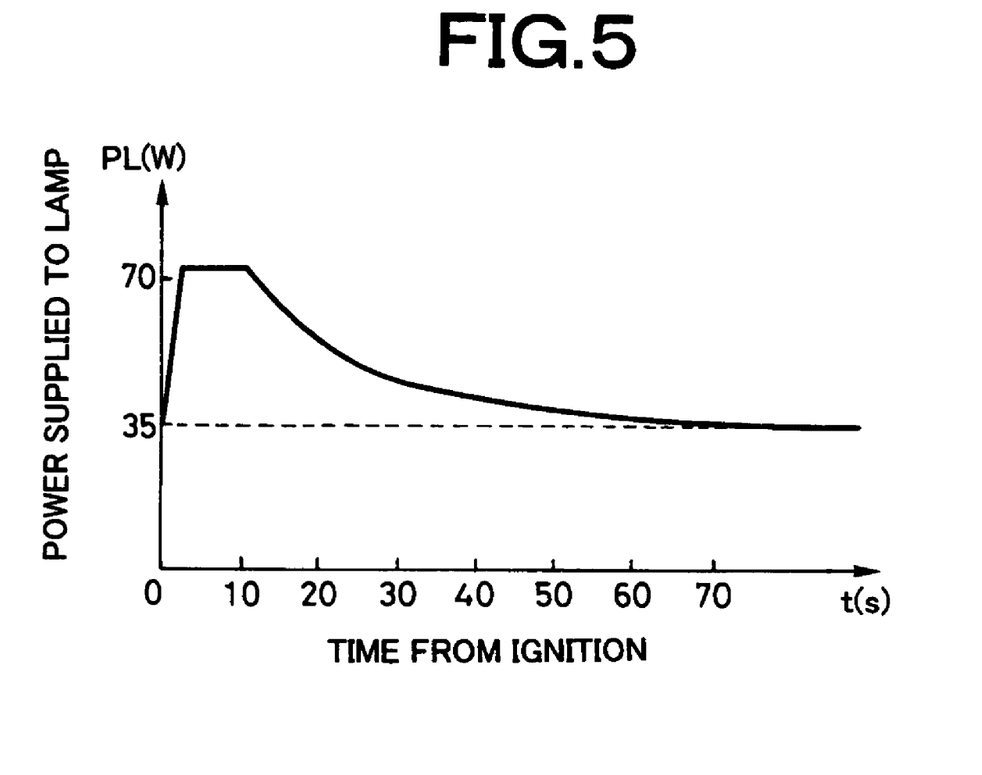
FIG. 5 is a graph showing a variation in power supplied to the HID lamp according to the embodiment of the present invention.

Immediately after the ignition of the lamp, the operating device generally needs to supply lamp power at least twice rated power. FIG. 5 shows this condition in which in contrast to rated power of 35 W, power of approximately 70 W is required immediately after the ignition.

Thus, because of the special circumstance that the lamp needs to be supplied with high power immediately after the ignition so as to function as the operating device for the head lamp for a vehicle, a DC-DC converter circuit of the operating device also needs to be designed to be able to supply high power at the time of ignition.

On the other hand, in order to further improve the safety of more drivers, not only medium-size cars and full-size cars but also popular cars and light cars are required to mount the HID lamp in the future and in line with the demand for reductions in the size and weight of vehicles in recent years, it is an urgent task to reduce the size and weight of the operating device.

In order to reduce the size and weight of the operating device, an effort is conventionally underway to reduce the size and weight of the operating device by reducing the diameter of the winding of a DC-DC converter transformer and thereby reducing the size of this transformer.

Though a reduction in the diameter of the winding involves a problem of heat generation, the aforementioned measures are adopted giving priority to reductions in the size and weight of the DC-DC converter transformer on condition that greater power can be supplied exclusively for a predetermined period from the ignition.

On the other hand, promoting reductions in the size and weight of the DC-DC converter transformer requires the size of a core part which makes up a large proportion of the weight of the transformer to be reduced.

However, attempting to reduce the size of the core part of the DC-DC converter transformer having the structure of the conventional DC-DC converter circuit increases the tendency of magnetic saturation to occur, preventing large power necessary to operate the lamp from being obtained. That is, the aforementioned special circumstance for allowing the device to operate as the operating device for a head lamp of a vehicle constitutes considerable hindrance in reducing the size of the core part, and for this reason reductions in the size and weight of the operating device have been limited to minor reductions in the size and weight of the above described winding.

The present invention has been implemented in view of such circumstances and it is an object of the present invention to provide a high intensity discharge lamp operating device for operating a HID head lamp for a vehicle capable of reducing the size and weight of a DC-DC converter circuit, and accordingly of the operating device without generating any magnetic saturation of a transformer core part even when igniting the lamp.

DISCLOSURE OF THE INVENTION

The high-voltage discharge lamp operating device of the present invention comprises a DC power supply circuit which increases the voltage of a DC voltage source (DC power supply) using a switching element, smoothes and outputs the voltage, a full-bridge circuit which converts the DC voltage output from this DC power supply circuit to an AC voltage and operates the high-voltage discharge lamp continuously, a high-voltage pulse generation circuit which generates a high-voltage pulse to be superimposed on the AC voltage signal output from this full-bridge circuit for igniting the high-voltage discharge lamp and a switch changeover signal control circuit which outputs a PWM control signal for controlling the duty ratio of a signal waveform so as to extend an ON-state period of the switching element when igniting the high-voltage discharge lamp and shorten the ON-state period of the switching element during normal operation, characterized in that the switch changeover signal control circuit is provided with oscillation frequency control means for controlling the frequency of the PWM control signal so as to realize a high frequency for a predetermined period from the ignition of the high-voltage discharge lamp and a low frequency after the lapse of the predetermined period.

Furthermore, the oscillation frequency control means can be constructed so as to comprise a switching frequency signal generation section which generates a rectangular wave having a frequency corresponding to a time after the ignition of the high-voltage discharge lamp and an oscillator which converts the rectangular wave from the switching frequency signal generation section into a triangular wave or sine wave.

Furthermore, the DC power supply circuit can also comprise, for example, a flyback circuit and the switching element can be constructed so as to control the current flowing through a primary winding of the booster transformer of the flyback circuit.

BRIEF DESCRIPTION OF THE DRAWINGS

FIG. 4(A)(I) shows an output signal waveform having an oscillation frequency of 200 KHz from the oscillation frequency control means shown in FIG. 1, FIG. 4(A)(II) shows an input signal waveform in the comparator shown in FIG. 1 when the output signal from the oscillation frequency control means is FIG. 4(A)(I), FIG. 4(A)(III) shows a PWM control signal waveform from the comparator shown in FIG. 1 when the output signal from the oscillation frequency control means is FIG. 4(A)(I), FIG. 4(B)(I) shows an output signal waveform having an oscillation frequency of 100 KHz from the oscillation frequency control means shown in FIG. 1, FIG. 4(B)(II) shows an input signal waveform in the comparator shown in FIG. 1 when the output signal from the oscillation frequency control means is FIG. 4(B)(I) and FIG. 4(B)(III) shows a PWM control signal waveform from the comparator shown in FIG. 1 when the output signal from the oscillation frequency control means is FIG. 4(B)(I);

BEST MODE FOR CARRYING OUT THE INVENTION

With reference now to the attached drawings, an embodiment of a high-voltage discharge lamp operating device according to the present invention will be explained below. Here, the apparatus of this embodiment is a high-voltage discharge lamp operating device for a HID head lamp for a vehicle and before explaining a PWM control unit (switch changeover signal control circuit) which is a point of the apparatus of this embodiment, the circuit structure of the overall apparatus will be explained using FIG. 2 and FIG. 3.

Figure 2:
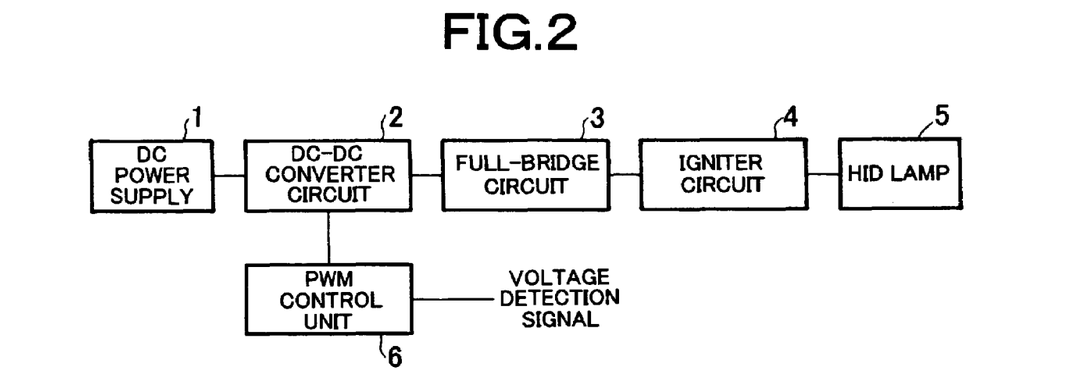
FIG. 2 is a block diagram showing the operating device according to the embodiment of the present invention.

FIG. 2 is a block diagram showing the circuit structure of the overall apparatus and shows that the apparatus of this embodiment is constructed of a vehicle-mounted battery as a DC voltage source 1, a DC-DC converter circuit (DC power supply circuit) 2 which increases the voltage of the DC voltage source 1 using a switching element and smoothes and outputs the voltage, a full-bridge circuit 3 which converts the DC voltage output from the DC-DC converter circuit 2 to an AC voltage and operates the high-voltage discharge lamp continuously, an igniter circuit (high-voltage pulse generation circuit) 4 which generates a high-voltage pulse to be superimposed on the AC voltage signal output from this full-bridge circuit 3 for igniting a HID lamp (high-voltage discharge lamp) 5, and a PWM control unit (switch changeover signal control circuit) 6 which outputs a PWM control signal for controlling the duty of a rectangular wave so as to extend an ON-state period of the switching element when igniting the HID lamp 5 and shorten the ON-state period of the switching element during normal operation.

Furthermore, the PWM control unit 6 is provided with oscillation frequency control means for controlling the frequency of the PWM control signal to a high frequency for a predetermined period from the ignition of the HID lamp 5 and a low frequency after the lapse of the predetermined period.

In the apparatus of this embodiment, a 35 W bulb for a vehicle is used as the HID lamp 5.

Figure 3:
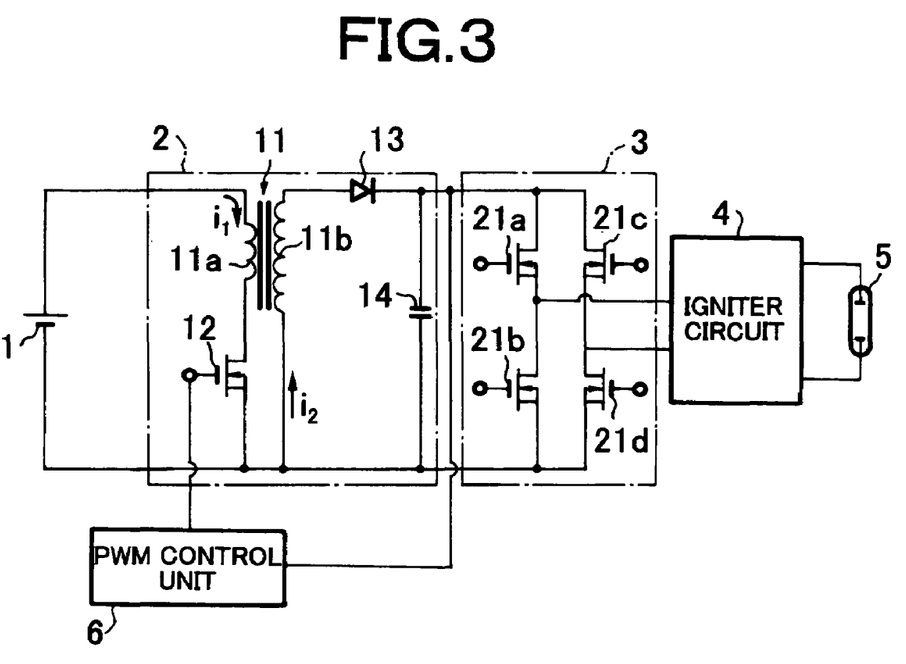
FIG. 3 is a circuit diagram showing the operating device according to the embodiment of the present invention.

Next, the circuit structure will be explained more specifically using FIG. 3.

The DC-DC converter circuit 2 has a structure generally called a "flyback circuit" and includes a flyback transformer 11 provided with a primary winding 11a disposed on the DC voltage source 1 side and a secondary winding 11b disposed on the HID lamp 5 side and an FET 12 as a switching element connected to the primary winding 11a. Furthermore, the DC-DC converter circuit 2 also includes a rectification diode 13 connected to the secondary winding 11b and an output smoothing capacitor 14. Here, when the FET 12 is turned ON, a primary current $i_1$ flows through the primary winding 11a of the flyback transformer 11, energy is stored in the primary winding 11a and when the FET 12 is turned OFF, this stored energy is released from the secondary winding 11b as a current $i_2$. When such an operation is further repeated, a high voltage is output from a connection point (detection point of the aforementioned voltage detection signal) between the diode 13 and smoothing capacitor 14 to the full-bridge circuit 3.

The full-bridge circuit 3 forms an inverter circuit, AC-operates the HID lamp 12 through a rectangular wave signal and is constructed of four FETs 21a to 21d arranged like a bridge. Of the four FETs 21a to 21d, the FETs 21a, 21d and FETs 21b, 21c are driven ON/OFF alternately by a bridge drive circuit (not shown). Therefore, the orientation of the discharge current of the HID lamp 5 is switched alternately, the polarity of the discharge voltage of the HID lamp 5 is inverted and the HID lamp 5 is AC-operated.

The igniter circuit 4 is intended to apply a high-voltage pulse to the HID lamp 5 when igniting the HID lamp 5 to operate this HID lamp 5. That is, the igniter circuit 4 is provided with a capacitor which stores the pulse energy, a pulse transformer and a switch element (thyristor) for applying the energy of the capacitor to the primary side of the pulse transformer, and when a gate signal is applied to the switch element (thyristor), the capacitor discharges through the primary winding of the pulse transformer, generates a high-voltage pulse on the secondary winding of the pulse transformer, this high-voltage pulse is applied to the HID lamp 5 producing dielectric breakdown between the electrodes of the HID lamp 5 and igniting the HID lamp 5.

The respective elements, the DC-DC converter circuit 2, full-bridge circuit 3 and igniter circuit 4, are controlled by a control circuit (not shown) (control is actually performed by a control unit adjacent to the PWM control unit 6).

However, as described above, the DC-DC converter circuit 2 changes the amount of energy discharged from the flyback transformer 11 by switching between the ON/OFF-states of the FET 12 which is the switching element. The switching between the ON/OFF-states of this FET 12 is controlled by the PWM control unit 6 as described above.

Figure 7:
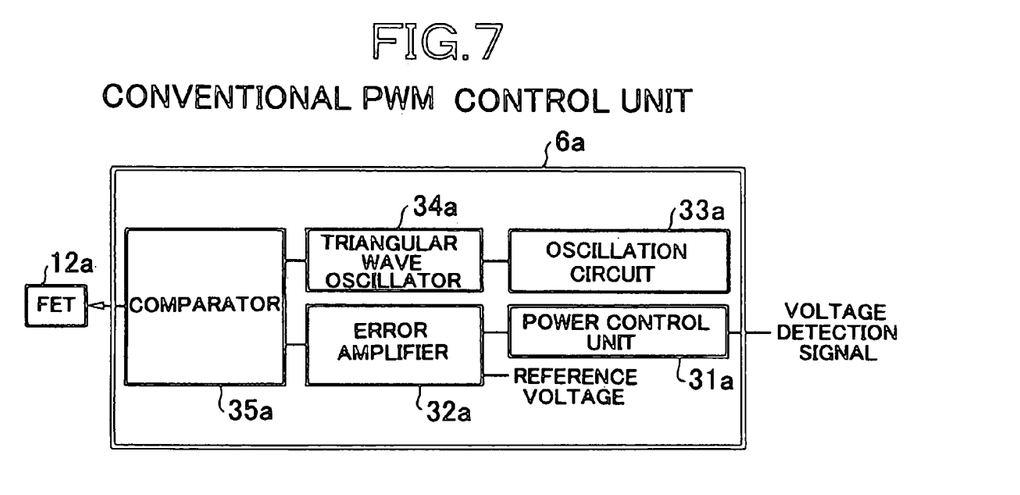
FIG. 7 is a block diagram showing a PWM control unit of a conventional operating device.

FIG. 7 is a block diagram showing the configuration of a conventional PWM control unit 6a. In FIG. 7, the components corresponding to those in the PWM control unit 6 of this embodiment which will be described later are assigned the same reference numerals as those in the embodiment and expressed with "a" added to indicate that those components belong to the conventional art.

That is, the conventional PWM control unit 6a is provided with a power control unit 31a which receives a voltage detection signal obtained by detecting a voltage from a connection point between a diode 13 and smoothing capacitor 44 of a DC-DC converter circuit 2 and outputs a signal based on the detected voltage, an error amplifier 32a which compares the output from this power control unit 31a with a reference voltage and outputs an error level signal on the level based on the error voltage, an oscillation circuit 33a which outputs a rectangular wave with a predetermined frequency, a triangular wave oscillator 34a which converts the rectangular wave from this oscillation circuit 33a into a triangular wave and a comparator 35a which compares the error level signal with the triangular wave signal output from the triangular wave oscillator 34a and outputs a PWM control signal on H-level during the period in which the triangular wave signal is high to a switching element 12a, and the switching element 12a is controlled so as to be in an ON-state during the H-level period of the input PWM control signal.

Immediately after the ignition of the lamp, it is generally necessary to supply lamp power at least twice rated power from the operating device, and in the case of the aforementioned HID lamp 5, rated power is 35 W, whereas power of approximately 70 W is required immediately after the ignition. Such power switching is controlled by the power control unit 31a which outputs a signal based on the aforementioned detected voltage. That is, the output from this power control unit 31a is controlled and the level of the error level signal is controlled and the HID lamp 5 is controlled so that the duty of the H-level period immediately after the ignition of the HID lamp 5 is higher than during normal operation.

However, attempting to obtain large power when igniting the HID lamp 5 increases the tendency of magnetic saturation to occur in the core part of the flyback transformer 11 and makes it difficult to reduce the size of this core part.

Figure 1:
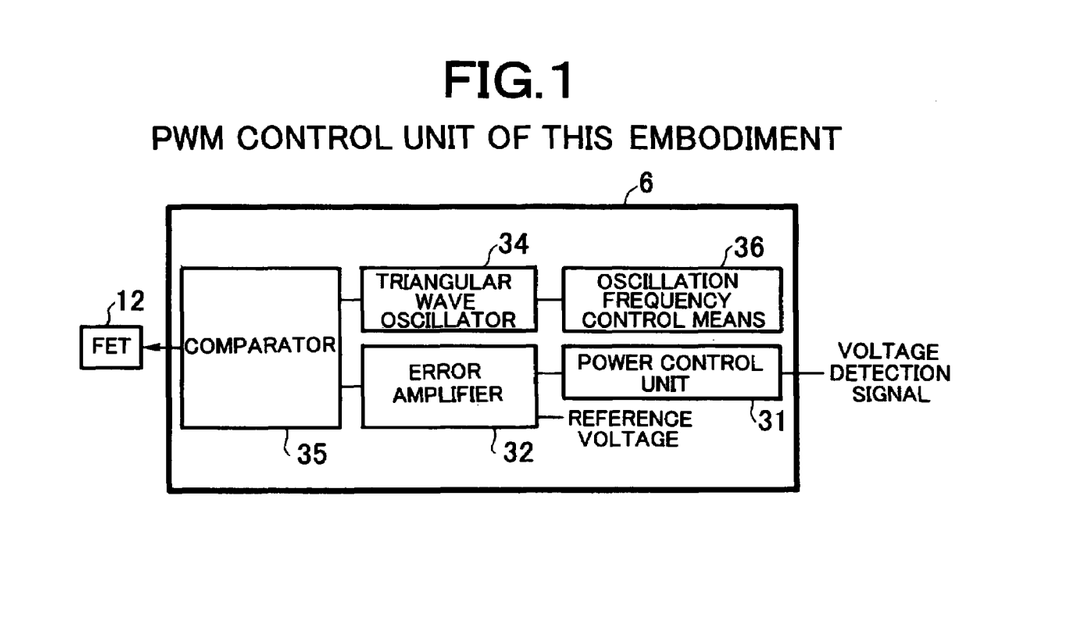
FIG. 1 is a block diagram showing a PWM control unit of an operating device according to an embodiment of the present invention.

Therefore, the high-voltage discharge lamp operating device in this embodiment provides oscillation frequency control means 36 for the PWM control unit 6 as shown in FIG. 1 to control the PWM control signal to be output to the FET 12 to a high frequency for a predetermined period from the ignition of the HID lamp 5 and a low frequency after the lapse of a predetermined period. That is, this embodiment realizes a reduction in the size of the core part by taking advantage of the fact that when the frequency of the PWM control signal is set high and the switching frequency of the switching element is set high, the peak value of the current waveform flowing through the winding of the transformer decreases, reducing the tendency of magnetic saturation to occur.

As shown in FIG. 1, just like the aforementioned PWM control unit 6a, the PWM control unit 6 is provided with a power control unit 31 which receives a voltage detection signal obtained by detecting the voltage of a connection point between the diode 13 and smoothing capacitor 14 of the DC-DC converter circuit 2 and outputs a signal based on the detected voltage, an error amplifier 32 which compares the output from this power control unit 31 with a reference voltage and outputs an error level signal on the level based on the error voltage, an oscillation frequency control means 36 which outputs a rectangular wave of 200 KHz for a predetermined period from the ignition of the HID lamp 5 and 100 KHz after the lapse of the period, a triangular wave oscillator 34 which converts the rectangular wave of this oscillation frequency control means 36 into a triangular wave and a comparator 35 which compares the error level signal with the triangular wave signal output from the triangular wave oscillator 34 and outputs a PWM control signal on H-level during the period in which the triangular wave signal is higher to the switching element 12, and the switching element 12 is controlled so as to be in an ON-state during the H-level period of the input PWM control signal.

Figure 4:
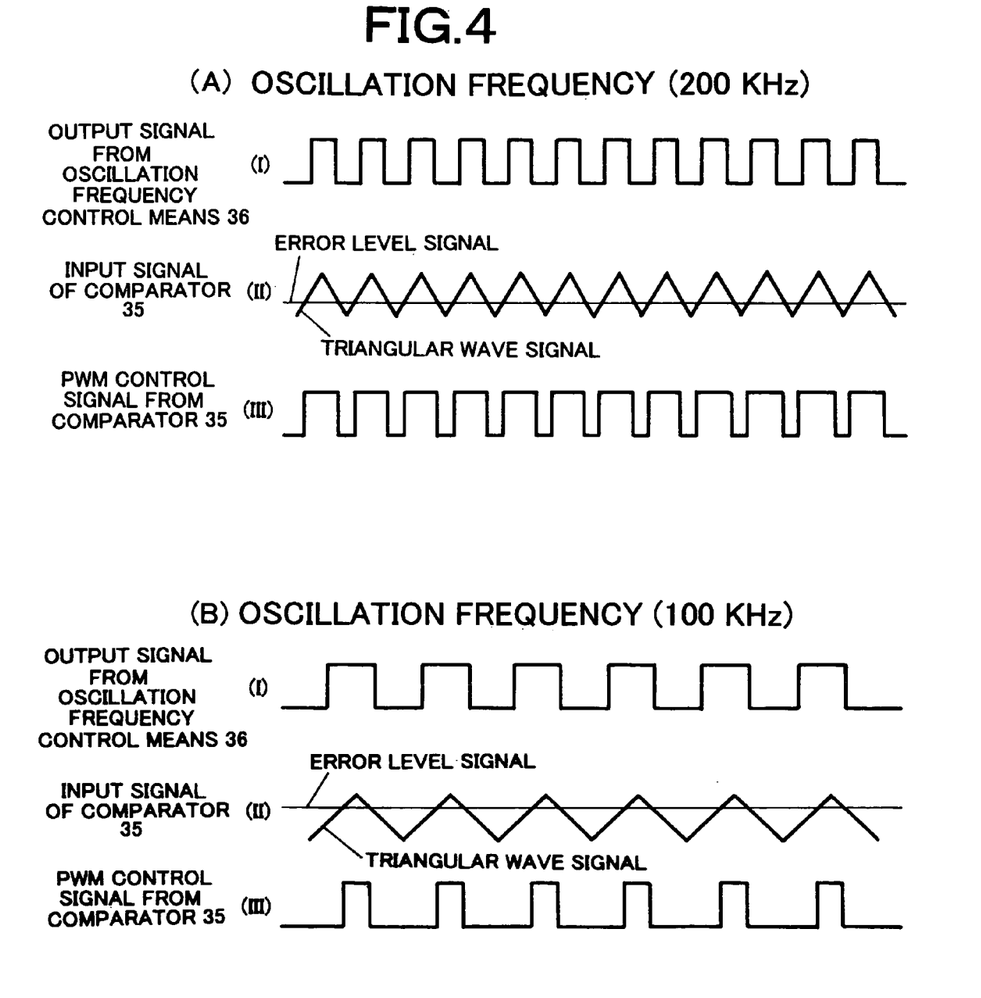

The operation of the PWM control unit 6 will be explained using FIG. 4 below.

First, for a predetermined period from the ignition of the HID lamp 5, a 200 KHz oscillation frequency signal (rectangular wave) as shown in FIG. 4(A) is output from the oscillation frequency control means 36 (signal waveform (I)). This 200 KHz oscillation frequency signal is converted into a 200 KHz triangular wave signal by the triangular wave oscillator 34 and compared by the comparator 35 with an error level signal from the error amplifier 32 (signal waveform (II)). Through a signal comparison by the comparator 35, the 200 KHz PWM control signal on H-level during the period in which the triangular wave signal is higher (the H-level duty in the signal waveform is higher) is output to the switching element 12 (signal waveform (III)).

On the other hand, after the lapse of the predetermined period from the ignition of the HID lamp 5, a 100 KHz oscillation frequency signal (rectangular wave) is output from the oscillation frequency control means 36 as shown in FIG. 4(B) (signal waveform (I)). This 100 KHz oscillation frequency signal is converted into a 100 KHz triangular wave signal by the triangular wave oscillator 34 and compared by the comparator 35 with the error level signal from the error amplifier 32 as in the case of (A) above (signal waveform (II)). Through a signal comparison by the comparator 35, the 100 KHz PWM control signal on H-level during the period in which the triangular wave signal is higher (the H-level duty in the signal waveform is smaller) is output to the switching element 12 (signal waveform (III)).

In this way, the high-voltage discharge lamp operating device in this embodiment provides the oscillation frequency control means 36 for the PWM control unit 6, and can thereby control the PWM control signal output to the FET 12 to a high frequency for a predetermined period from the ignition of the HID lamp 5 and a low frequency after the lapse of the predetermined period.

By increasing the H-level duty of the PWM control signal when igniting the HID lamp 5, large energy is stored in the primary winding 11a of the flyback transformer 11 and this large energy stored is released from the secondary winding 11b when the FET 12 is turned OFF. In the above described embodiment, since the H-level duty of the PWM control signal when igniting the HID lamp 5 is set to approximately twice that during normal operation, the power supplied to the HID lamp 5 when igniting the HID lamp 5 also becomes approximately twice that during normal operation. As described above, since the power supplied to the HID lamp 5 during normal operation is 35 W, the power supplied for a predetermined period from the ignition of the HID lamp 5 can be set to approximately 70 W.

FIG. 5 is a graph showing a supply in power and shows that the power supplied is set to approximately 70 W for a predetermined period from the ignition of the HID lamp 5 and approximately 35 W during normal operation.

The above described predetermined period can be set as appropriate, for example, approximately 10 sec as shown in FIG. 5.

Figure 6:
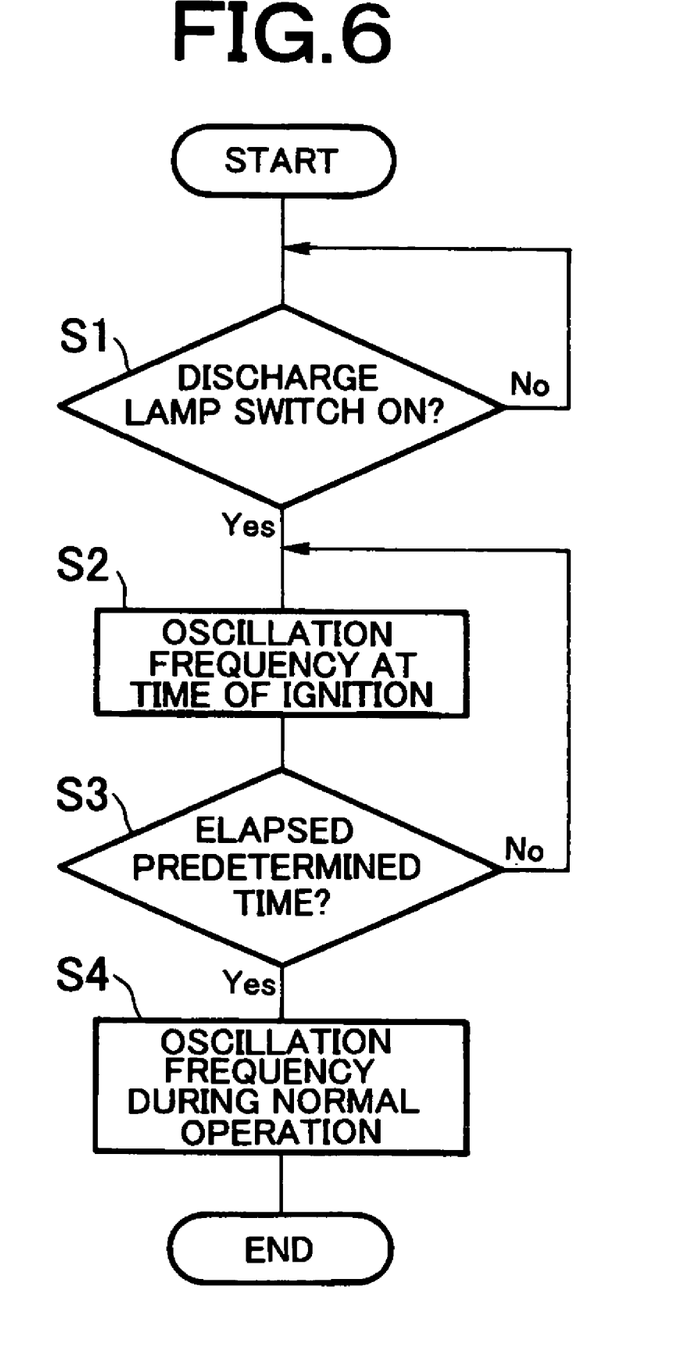
FIG. 6 is a flow chart showing processing steps of a CPU of the oscillation frequency control means shown in FIG. 1.

FIG. 6 is a flow chart showing processing steps of a CPU (not shown) which controls the oscillation frequency control means 36 and the specific steps are stored in a ROM attached to the CPU.

That is, the CPU decides whether the discharge lamp (HID lamp) switch is set in an ON-state or not all the time (S1) and when the CPU decides the ON-state, the CPU causes the oscillation frequency control means 36 to output an oscillation frequency signal having an oscillation frequency at the time of ignition (200 KHz) (S2). Then, the CPU decides whether a predetermined period has elapsed from the ignition or not (S3) and when the CPU decides that a predetermined period has elapsed from the ignition, the CPU causes the oscillation frequency control means 36 to output an oscillation frequency signal having the oscillation frequency during normal operation (100 KHz) (S4).

Thus, this embodiment sets a high switching frequency for a predetermined period from the ignition of the HID lamp 5, decreases the tendency of magnetic saturation to occur in the core part of the flyback transformer 11, and therefore even when the size of this core part is reduced, no magnetic saturation occurs and it is possible to obtain power necessary for operation of the lamp continuously. Furthermore, since the current value decreases, it is also possible to reduce the size of the FET 12, the switching element, and drastically reduce the overall size and weight of the DC-DC converter circuit 2.

Increasing the oscillation frequency results in an increase in the switching frequency of the FET 12, which possibly causes problems like an increase of core loss such as iron loss and eddy current in the core part of the flyback transformer 11, degradation of the conversion efficiency of the transformer 11 and increase in switching loss by the FET 12 resulting in an increased amount of heat generation, but since the period in which the frequency is increased is a short time as described above, such core loss and switching loss can be neglected.

The high-voltage discharge lamp operating device of the present invention is not limited to the above described embodiment, but can be modified in various ways.

For example, the above described embodiment assumes that the oscillation frequency signal from the oscillation frequency control means 36 is 200 KHz for a predetermined period from the ignition and 100 KHz after the lapse of the predetermined period, but the frequency can be changed as appropriate and the oscillation frequency signal can also be set to, for example, 300 KHz for a predetermined period from the ignition. Furthermore, not only the above described triangular wave but also, for example, a sine wave can be used as the signal to be compared with an error level signal.

Furthermore, according to the above described embodiment, the oscillation frequency is changed by the oscillation frequency control means for approximately 10 sec from the ignition, but the oscillation frequency may also be changed when the power indicated by a power supplied signal from the power control unit falls below predetermined power (e.g., 60 W or below).

Furthermore, frequency control by the oscillation frequency control means 36 is performed based on a program stored in the ROM attached to the CPU, but it is also possible to change time constants of timing C, R (capacitance and resistance) for determining the oscillation frequency provided in this oscillation frequency control means 36 using an electronic switch.

Furthermore, the aforementioned DC power supply circuit is not limited to the circuit structure of the DC-DC converter circuit 2, full-bridge circuit 3 and igniter circuit 4 of the above described embodiment, but can be modified in other various modes.

As described in detail above, the high-voltage discharge lamp operating device of the present invention sets a high switching frequency for the switching element for increasing the voltage of the DC power supply voltage for a predetermined period from the ignition of the high-voltage discharge lamp compared to subsequent normal operation. Thus, setting a high switching frequency decreases the peak value of the current waveform flowing through the winding and decreases the tendencies of magnetic saturation to occur. For this reason, even when the size of the magnetic core part which forms the converter transformer of the DC power supply circuit is reduced, no magnetic saturation occurs and it is possible to obtain power necessary for ignition of the lamp. Moreover, since the current value is decreased, the size of the switching element can also be reduced and it is possible to drastically reduce the size and weight of the operating device as a whole.

The invention claimed is:

1. A high-voltage discharge lamp operating device comprising:
a DC power supply circuit which increases the voltage of a DC voltage source using a switching element, smoothes and outputs the voltage;
a full-bridge circuit which converts the DC voltage output from said DC power supply circuit to an AC voltage and operates the high-voltage discharge lamp continuously;
a high-voltage pulse generation circuit which generates a high-voltage pulse to be superimposed on the AC voltage signal output from said full-bridge circuit for igniting said high-voltage discharge lamp; and
a switch changeover signal control circuit which outputs a PWM control signal for controlling the duty of a signal waveform so as to extend an ON-state period of said switching element when igniting said high-voltage discharge lamp and shorten the ON-state period of said switching element during normal operation,
characterized in that said switch changeover signal control circuit is provided with oscillation frequency control means for controlling the frequency of said PWM control signal so as to realize a high frequency for a predetermined period from the ignition of said high-voltage discharge lamp and a low frequency after the lapse of said predetermined period.

2. The high-voltage discharge lamp operating device according to claim 1, characterized in that said oscillation frequency control means comprises a switching frequency signal generation section which generates a rectangular wave having a frequency corresponding to a time after the ignition of said high-voltage discharge lamp and an oscillator which converts the rectangular wave from said switching frequency signal generation section into a triangular wave or sine wave.

3. The high-voltage discharge lamp operating device according to claim 1, characterized in that said DC power supply circuit comprises a flyback circuit and said switching element is constructed so as to control the current flowing through a primary winding of the booster transformer of said flyback circuit.

4. The high-voltage discharge lamp operating device according to claim 1, characterized in that said switching element is an FET.

5. The high-voltage discharge lamp operating device according to claim 1, characterized in that said high frequency is approximately 200 KHz and said low frequency is approximately 100 KHz.

6. The high-voltage discharge lamp operating device according to claim 1, characterized in that said predetermined period is approximately 10 sec.

7. The high-voltage discharge lamp operating device according to claim 1, characterized in that said high-voltage discharge lamp is a light source for a head light of a vehicle.

* * * * *